United States Patent [19]

Adamson, Jr. et al.

[11] 4,407,009

[45] Sep. 27, 1983

[54] RETROFITTING A TELEVISED OUTPUT DEVICE ON A THERMAL IMAGER

[75] Inventors: James R. Adamson, Jr.; Stanley L. Carts, Jr., both of Alexandria, Va.

[73] Assignee: The United States of America as represented by the Secretary of the Army, Washington, D.C.

[21] Appl. No.: 315,373

[22] Filed: Oct. 27, 1981

[51] Int. Cl.³ .......................... H04N 5/26; H04N 5/33
[52] U.S. Cl. .................................... 358/113; 250/330; 250/333; 350/299; 358/225; 358/229
[58] Field of Search .................... 358/93, 95, 97, 108, 358/113, 125, 224, 225, 229; 354/219, 219 IF, 223, 224, 225; 250/330, 332, 333, 334; 350/297, 300, 301, 302, 299, 307

[56] References Cited
U.S. PATENT DOCUMENTS

| | | | |
|---|---|---|---|
| 2,898,831 | 8/1959 | Smith, Jr. et al. | 358/225 |
| 3,175,089 | 3/1965 | Talley et al. | 358/225 |
| 3,891,795 | 6/1975 | Johnson et al. | 358/225 |
| 4,000,419 | 12/1976 | Crost et al. | 250/330 |
| 4,166,953 | 9/1979 | Menke et al. | 250/333 |
| 4,237,492 | 12/1980 | Roth et al. | 358/108 |

Primary Examiner—Joseph A. Orsino, Jr.
Attorney, Agent, or Firm—Robert P. Gibson; Milton W. Lee; Max L. Harwell

[57] ABSTRACT

An easy retrofitting of a night vision thermal imager to mount a television (TV) camera thereon which allows the thermal imager outputs to be viewed remotely by a CRT display. The retrofitting provides a compact and utilitarian remote viewing capability without altering the imager itself. An unpluggable mirror unit, positioned at the output of the imager, provides a folded light path allowing the TV camera to be mounted in an inverted position over the viewer and operate as a remote observation station with the mirror unit attached, or be viewed directly with the mirror unit removed.

3 Claims, 8 Drawing Figures

RETROFITTING A TELEVISED OUTPUT DEVICE ON A THERMAL IMAGER

The invention described herein may be manufactured, used, and licensed by the U.S. Government for governmental purposes without the payment of any royalties thereon.

BACKGROUND OF THE INVENTION

1. Field of the Invention

The invention relates to a mounting means for mounting a television camera and folding optical path mirror unit on a thermal imager to provide remote viewing by a cathode ray tube display tuned to the television.

2. Description of the Prior Art

Heretofore, inline mounting of a television (TV) camera to a night vision thermal imager system's optical output has resulted in a combination which has a long silhouette and excess bracketing to compensate for the change in the system's center of gravity. Also, with inline mounting of the TV camera, the camera must be removed in order to view the system output directly. This could be accomplished by use of a beam splitter, but would increase unit length and reduce the transferred light level.

SUMMARY OF THE INVENTION

A primary feature of the present invention lies in the means of retrofitting a TV camera to a thermal imager so that close coupled mounting of the camera over the thermal imager system causes only a slight change, if at all, in the center of gravity and thus maintains the same tripod mounting arrangement and does not need additional bracketing as in the inline mounting arrangement.

Another feature is an unpluggable mirror unit that provides a folded light path for the TV camera when plugged into the imager system and yet allows for direct viewing when the mirror unit is unplugged. The retrofitted TV camera mounting means and the plugged in mirror unit on the thermal imager operate as a remote observation station in which signals from the TV camera are transmitted to the CRT display, which displays the scene that the camera is viewing.

Still another feature is the ease by which the mounting is accomplished. The TV camera is first mounted on the thermal imager system in an inverted position which is necessary for right side up imagery on the CRT display. The mirror unit is vertically aligned and therefore inverts the imagery out of the thermal imager prior to entering the television camera, thus providing an output from the TV camera that is upright.

The TV camera and the unpluggable mirror unit are mounted as follows. A main mounting clamp, comprised of upper main mounting clamp and lower main mounting clamp, is attached to the camera and the system. The upper clamp has an opening for the camera objective lens and the upper and lower clamps have half circular openings in each that form an opening for the biocular lens in the thermal imager system biocular housing. A main support member is screw threadably connected to the camera mounting screws on the bottom of the TV camera, which is now facing up and into the upper main mounting clamp. The inverted camera provides for minimal vertical silhoutted height since the top of the TV camera is now flipped down and fits close to the system and the mounting screws fit into the main support member. A camera rear stabilizing bracket, comprised of upper rear support bracket attached to the rear side of the camera and a lower rear support bracket attached to both the upper rear support bracket and the system, locks the rear end of the camera to the system. The unpluggable mirror unit has a camera collar and a biocular collar that fit respectively into the upper main mounting clamp at the camera objective lens and into the upper and lower main mounting clamps at the biocular lens. The mirror unit is secured to the upper main mounting clamp by a means such as extension springs.

The invention is best understood with reference to the following drawings.

DETAILED DESCRIPTION OF THE INVENTION

Figure 1:
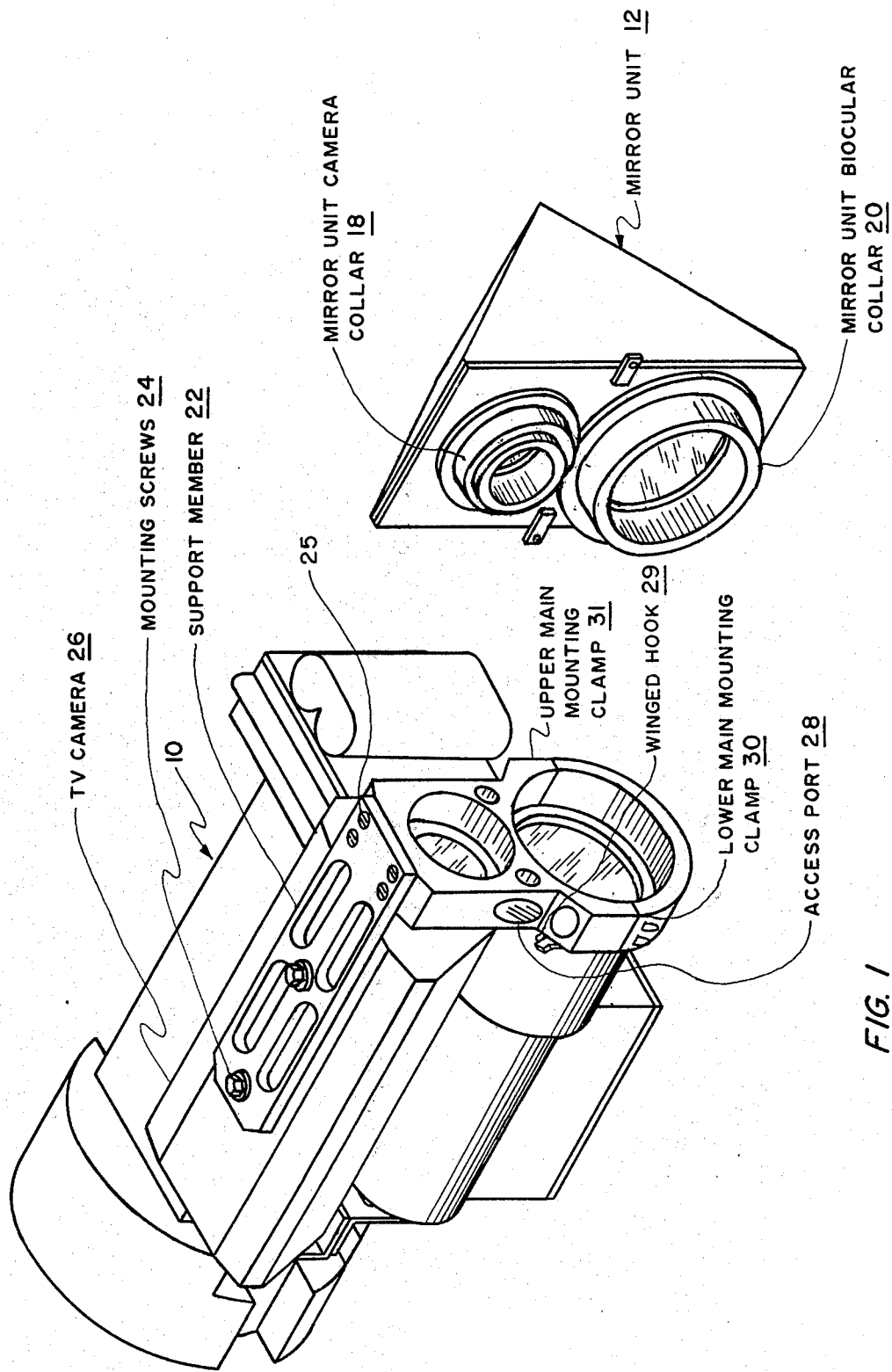
FIG. 1 illustrates the TV camera mounted thermal imager with the unpluggable mirror unit detached.
Figure 2:
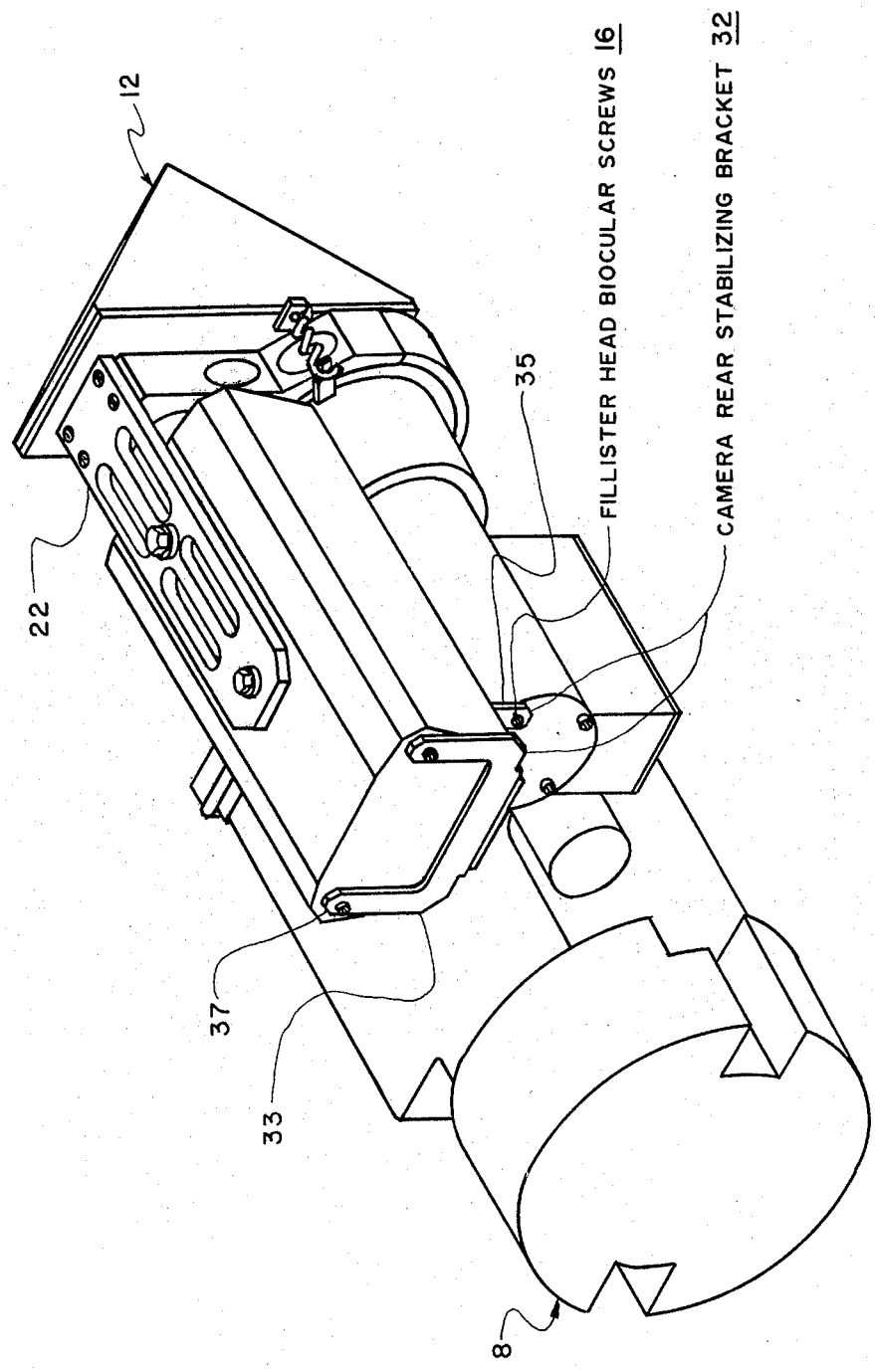
FIG. 2 illustrates the thermal image with the TV camera and mirror unit attached thereto.

The television (TV) camera 26 is retrofitted to the thermal imager system as shown in FIGS. 1 and 2 to transmit TV pictures to a CRT display. The thermal imager may be a thermal night observation device, e.g. the U.S. Army AN/TAS-6. The lower and upper clamps 30 and 31, the main support member 22, the upper and lower rear support brackets 33 and 35, and the mirror unit 12 housing are all preferably made of black anodized metal.

The thermal imager is indicated by numeral 10. The input 8, even though shown as having a cover thereon for protecting the input window, receives the image and routes the image across to the biocular unit housing and out the biocular lens therein at the opposite end of the imager 10. Previously, if a TV camera was used with the imager the camera was attached inline with the biocular lens. The present means of retrofitting the TV camera 26 onto the thermal imager system 10 is by using a mounting means in which the camera is folded back over the imager system in an inverted position, i.e. with the bottom now on top, and is firmly attached to the system by quick and easy screw threadable means. Once the TV camera is attached to the system a mirror unit 12, formed by a triangular shaped mirror housing having two mirrors on the inside at vertical right angles and an open camera collar 18 and an open biocular collar 20 acting as a folded optical path, is attached to the upper and lower main mounting clamps 31 and 30. The attachment will be better understood after the explanation of the mounting means for attaching the camera 26 to the imager 10.

Figure 5:
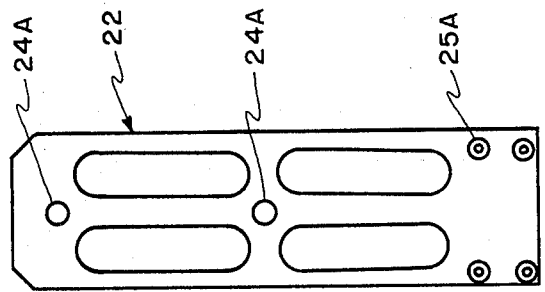
FIG. 5 shows a top view of the main support member.
Figure 4:
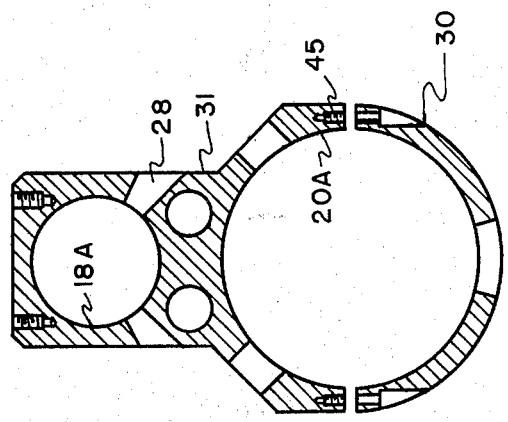
FIG. 4 shows an end view of the upper and lower main mounting clamps.
Figure 3:
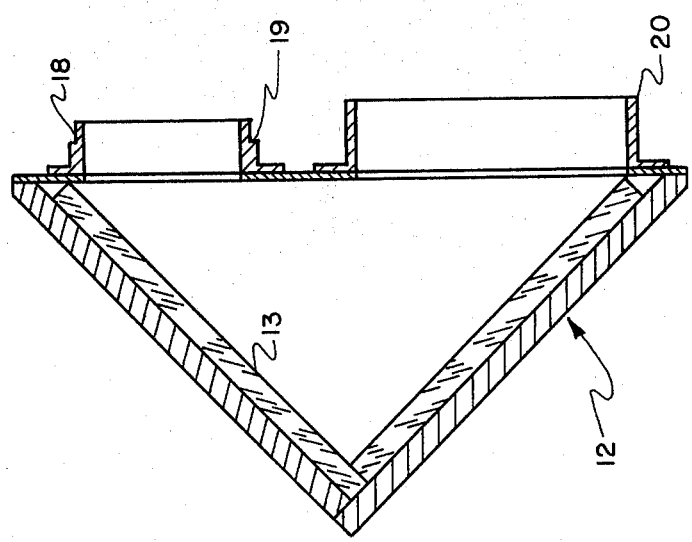
FIG. 3 illustrates a side cutaway of the mirror unit.
Figure 6B:
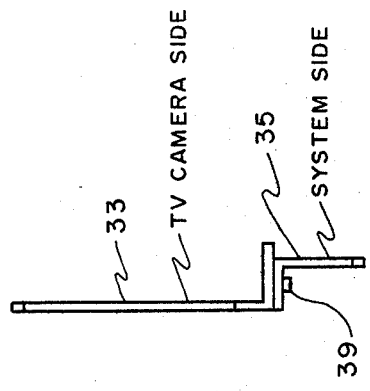
FIGS. 6A, 6B, and 6C respectively illustrate the end view, side view and a bottom view of the camera rear stabilizing bracket.
Figure 6A:
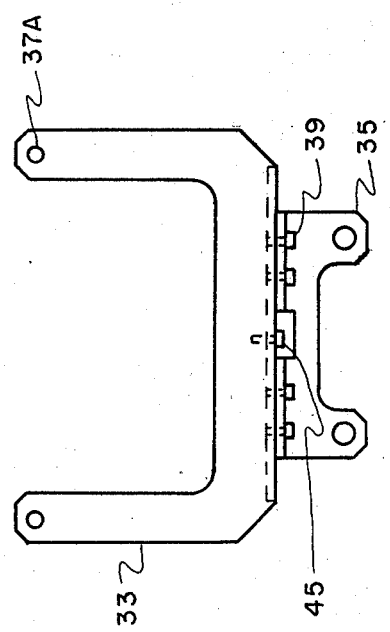
Figure 6C:
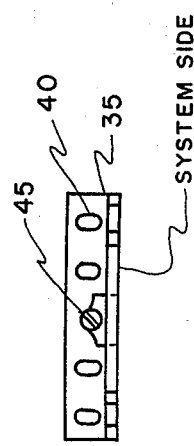

FIGS. 1 and 4 show the main mounting clamp, comprised of upper and lower main mounting clamps 31 and 30 respectively, which are affixed to the system biocular in a vertical and rearmost position and against the rim at the rear of the biocular. The two halves of 30 and 31 are preferably secured together by four 6-32 socket head cap screws in drilled and tapped holes 45. To mount the camera 26, it is first inverted and placed on top of the system biocular but under the main support member 22, shown in detail in FIG. 5, with the camera objective lens in the opening of clamp 31. The main support member 22 is attached to camera 26 by two mounting screws 24 passing through holes 24A in member 22. Member 22 is connected to clamp 31 preferably using four 6-32 socket head cap screws 25. At this time, the camera rear stabilizing bracket 32, which is comprised of an upper rear support bracket 33 and a lower rear support bracket 35, is attached to the camera and to the imager system. Bracket 33 is first fastened to the camera using three of the camera's case screws, two represented by numeral 37 at the rear of the camera passing through holes 37A of bracket 33 and another represented as numeral 45 on the top of the camera case at the rear, as shown in FIGS. 6A, 6B, and 6C. Some adjustments may be required at this point in conjunction with focusing of the camera objective lens for optimum resolution on the CRT display. Adjustments can be made through access holes 28 in upper clamp 31. The lower bracket 35 is now joined to upper bracket 33 using four 4-40 binder head screws 39 inserted through elongated holes 40 of bracket 35. Screws 39 are tightened in position through holes 40 with the system side of bracket 35 flush against the system biocular. Two fillister head biocular screws, represented by numeral 16, secure the back portion of the camera to the system.

The unpluggable mirror unit 12 is now ready to be secured to the main mounting clamps. The biocular collar 20 is fitted into the opening formed by the upper and lower main mounting clamps 31 and 30. The opening has a champhered siding 20A to provide a flush fit between collar 20 and the opening. The camera collar 18 is fitted into hole 18A of clamp 31 until shoulder 19 rests flush against clamp 31. A securing means, such as two extension springs affixed with one on each side of the mirror unit 12 that are attached to two winged hooks 29 on clamp 31, secures the mirror unit 12 to the system so that right angled positioned mirror 13 provide a folded light path for the imagery picked up by the thermal imager that is projected into the TV camera 26 to provide the necessary rightside up imagery for the CRT display. If direct viewing is required, e.g. as in the original positioning of the thermal imager toward a particular scene, the mirror unit 12 is detached from clamps 31 and 30 so that an operate can view the scene directly through the biocular.

While only one embodiment of the invention has been disclosed, it is to be understood that many variations, substitutions, and alterations may be made while remaining within the spirit and scope of the invention which is limited only by the following claims.

We claim:

1. A means of retrofitting a TV camera on a thermal imager system to provide remote viewing of a scene by a CRT display, said means comprising:

mounting means for mounting said TV camera in an inverted position over said thermal imager system, said mounting means comprised of a main mounting clamp having openings therein through which the camera objective lens and the biocular lens project with a main support member attached to both the TV camera and said main mounting clamp and a camera rear stabilizing bracket that is attached between said system and the rear side of said TV camera from said objective lens; and an unpluggable mirror unit providing a folded light path for said TV camera in an inverted mode necessary for rightside up imagery transmitted to said CRT display when plugged or providing a direct view of the scene when unplugged, said unpluggable mirror unit having securing means on the exterior of a mirror housing for attachment to said main mounting clamp and is comprised of two flat mirrors vertically mounted at right angles to each other on back surfaces within said mirror housing and a camera collar and biocular collar on a front outer surface wherein said camera collar and biocular collar fit snugly into said main mounting clamp around said camera objective lens and said biocular lens whereby imagery from the scene is projected through the biocular lens and is reflected off said two flat mirrors and through said camera objective lens into said TV camera.

2. A means as set forth in claim 1 wherein said main mounting clamp is comprised of upper and lower main mounting clamps secured together around said biocular by four 6-32 socket head screws, said main support member is attached to said TV camera by two $\frac{1}{4}$-20×$\frac{1}{2}$ inch long hexagonal head cap screws with flat washers and is attached to said upper main mounting clamp with four 6-32 socket head cap screws, wherein said camera rear stabilizing bracket is comprised of an upper rear support bracket which is attached to said camera using existing screws thereon and a lower rear support bracket having elongated slots therein which is screw threadably attached to the rear of the system biocular and through said elongated slots to said upper rear support bracket.

3. A means as set forth in claim 2 wherein said unpluggable mirror unit securing means is comprised of two extension springs thereon for securing to winged hooks on said upper main mounting clamp.

* * * * *